(12) United States Patent
Kameyama

(10) Patent No.: US 11,843,343 B2
(45) Date of Patent: Dec. 12, 2023

(54) MOTOR CONTROL APPARATUS THAT PERFORMS FAILURE DETERMINATION AND DETERMINATION OF ROTATIONAL POSITION OF ROTOR, AND IMAGE FORMING APPARATUS

(71) Applicant: CANON KABUSHIKI KAISHA, Tokyo (JP)

(72) Inventor: Shigeru Kameyama, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 923 days.

(21) Appl. No.: 16/732,865

(22) Filed: Jan. 2, 2020

(65) Prior Publication Data

US 2020/0235680 A1    Jul. 23, 2020

(30) Foreign Application Priority Data

Jan. 22, 2019 (JP) .................. 2019-008596

(51) Int. Cl.
*H02P 6/12* (2006.01)
*G03G 15/00* (2006.01)
*H02P 6/18* (2016.01)

(52) U.S. Cl.
CPC ............... *H02P 6/12* (2013.01); *G03G 15/55* (2013.01); *H02P 6/186* (2013.01)

(58) Field of Classification Search
CPC ............... G03G 15/80; G03G 15/5004; G03G 15/5008; G03G 15/55; H02P 6/12; H02P 6/186
USPC ..................................... 318/400.03
See application file for complete search history.

(56) References Cited

U.S. PATENT DOCUMENTS

| 9,431,940 | B2 | 8/2016 | Kameyama |
| 10,093,352 | B2 | 10/2018 | Mori et al. |
| 2015/0145454 | A1* | 5/2015 | Kameyama ........ G03G 15/5008 318/400.34 |
| 2015/0280627 | A1* | 10/2015 | Okumura ............. G03G 15/757 399/167 |

(Continued)

FOREIGN PATENT DOCUMENTS

| JP | 2002-262600 A | 9/2002 |
| JP | 2005-210830 A | 8/2005 |

(Continued)

OTHER PUBLICATIONS

Japanese Office Action dated Nov. 28, 2022 in counterpart Japanese Patent Appln. No. 2019-008596.
Co-pending U.S. Appl. No. 16/831,919, filed Mar. 27, 2020.

*Primary Examiner* — Kawing Chan
*Assistant Examiner* — Gabriel Agared
(74) *Attorney, Agent, or Firm* — Venable LLP

(57) ABSTRACT

A motor control apparatus includes: an excitation unit configured to excite a plurality of excitation phases of a motor; a measurement unit configured to measure a physical amount that changes according to an inductance of at least one of a plurality of coils that make up the plurality of excitation phases by exciting each of the plurality of excitation phases, and generate measured data that includes measurement values of the physical amount measured for the plurality of excitation phases; and a determination unit configured to determine, based on the measured data, a rotational position of a rotor of the motor and whether or not at least one of the motor and the excitation unit has a failure.

16 Claims, 12 Drawing Sheets

(56) References Cited

U.S. PATENT DOCUMENTS

| | | | |
|---|---|---|---|
| 2016/0043674 A1* | 2/2016 | Cheong | H02P 6/20 |
| | | | 318/400.11 |
| 2017/0111529 A1* | 4/2017 | Sato | H04N 1/00602 |
| 2018/0254722 A1* | 9/2018 | Umetsu | H02P 6/182 |
| 2019/0173402 A1 | 6/2019 | Kameyama | |
| 2019/0356252 A1 | 11/2019 | Kameyama | |
| 2019/0393812 A1 | 12/2019 | Kameyama | |
| 2020/0099323 A1* | 3/2020 | Luedtke | H02P 21/24 |
| 2020/0169212 A1* | 5/2020 | Huh | H02P 21/18 |

FOREIGN PATENT DOCUMENTS

| | | |
|---|---|---|
| JP | 2015-097472 A | 5/2015 |
| JP | 2015-104263 A | 6/2015 |
| JP | 2017-046469 A | 3/2017 |
| JP | 2018-102064 A | 6/2018 |

\* cited by examiner

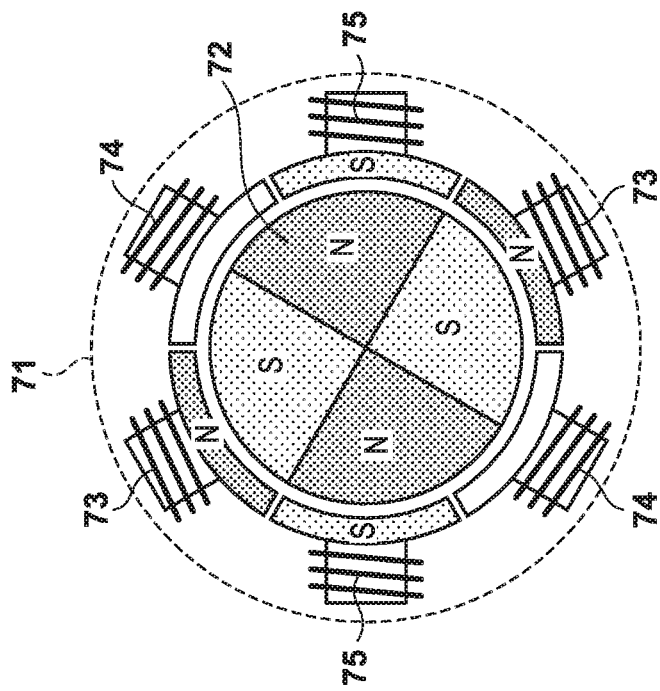
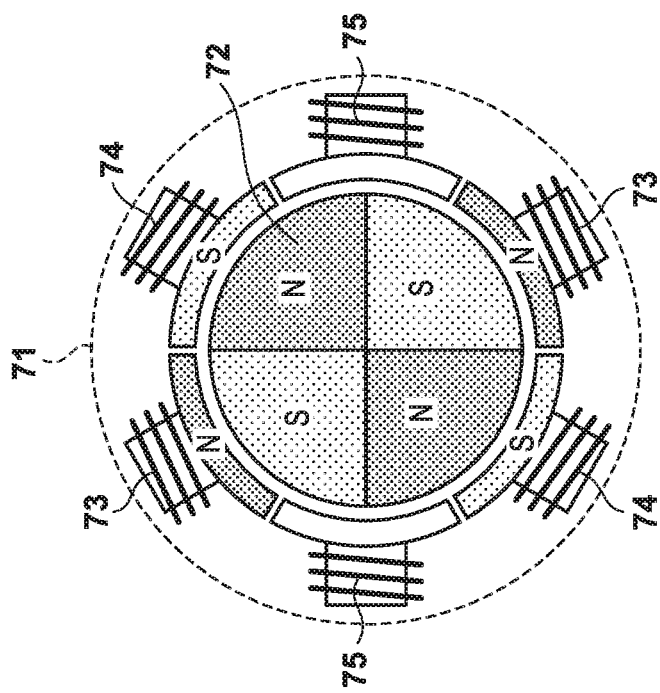

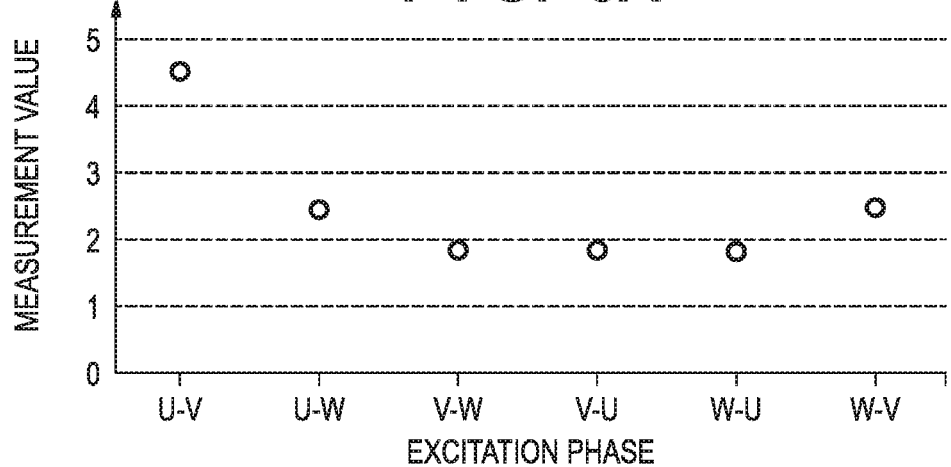
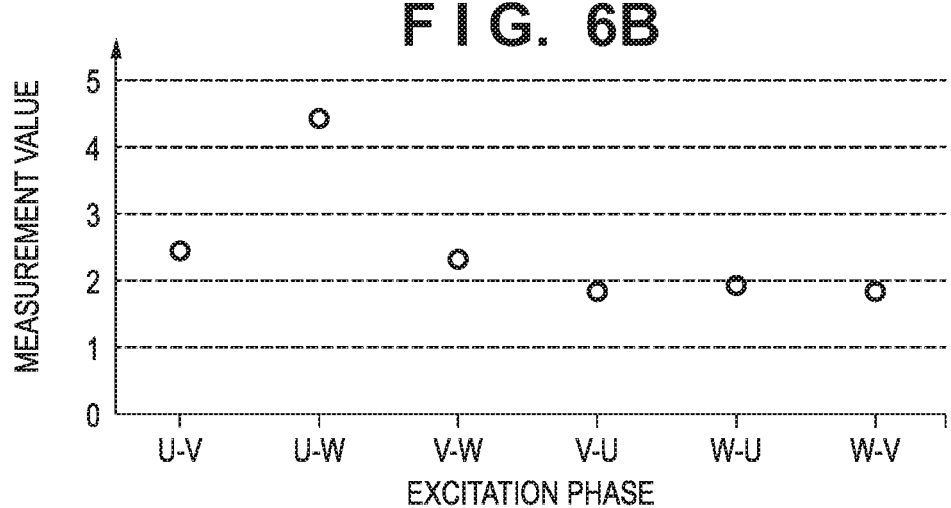
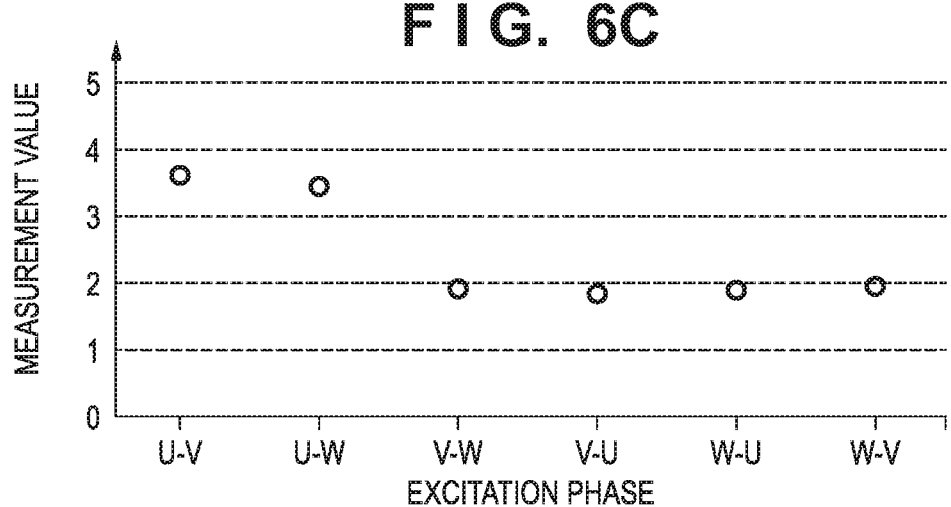

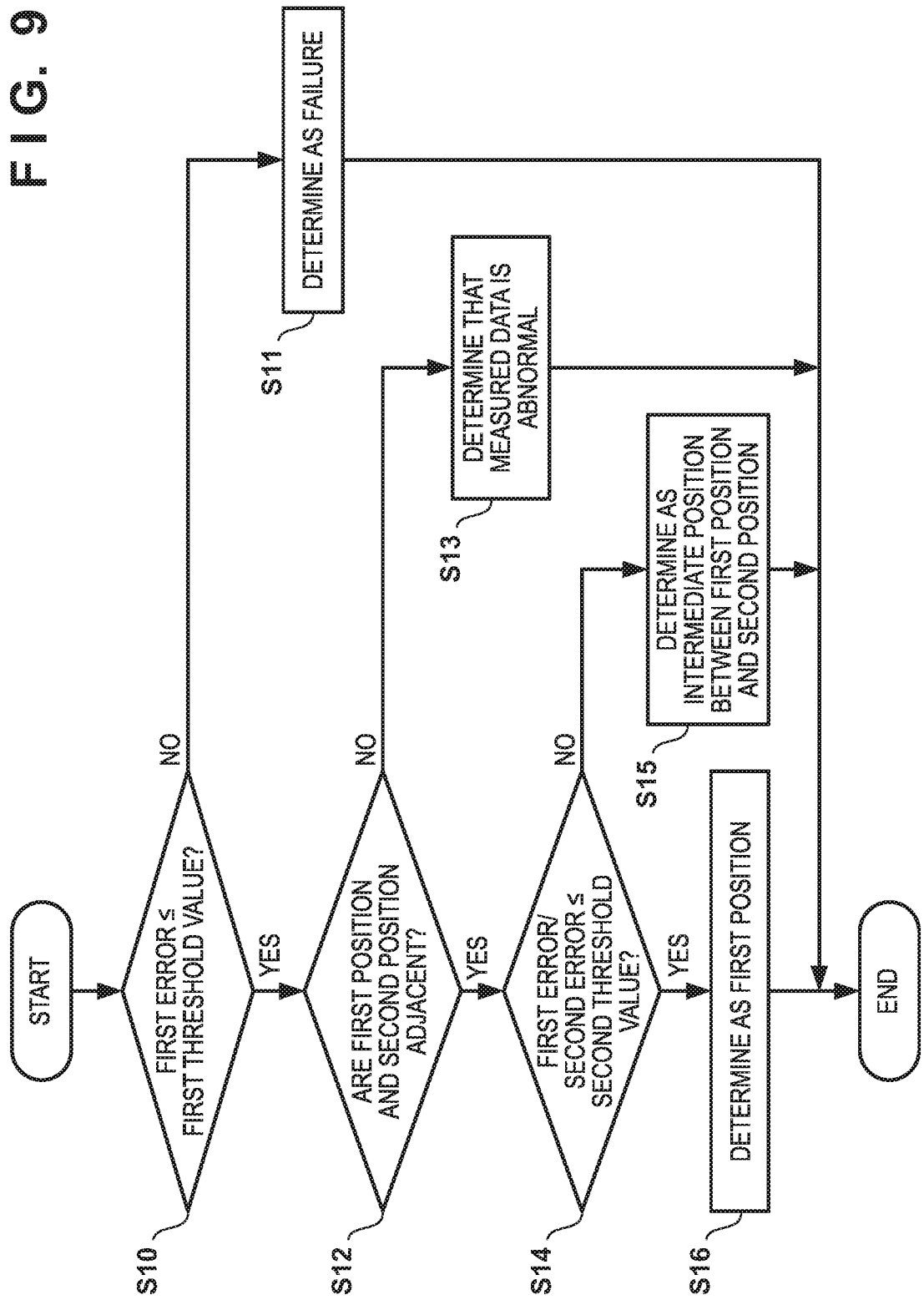

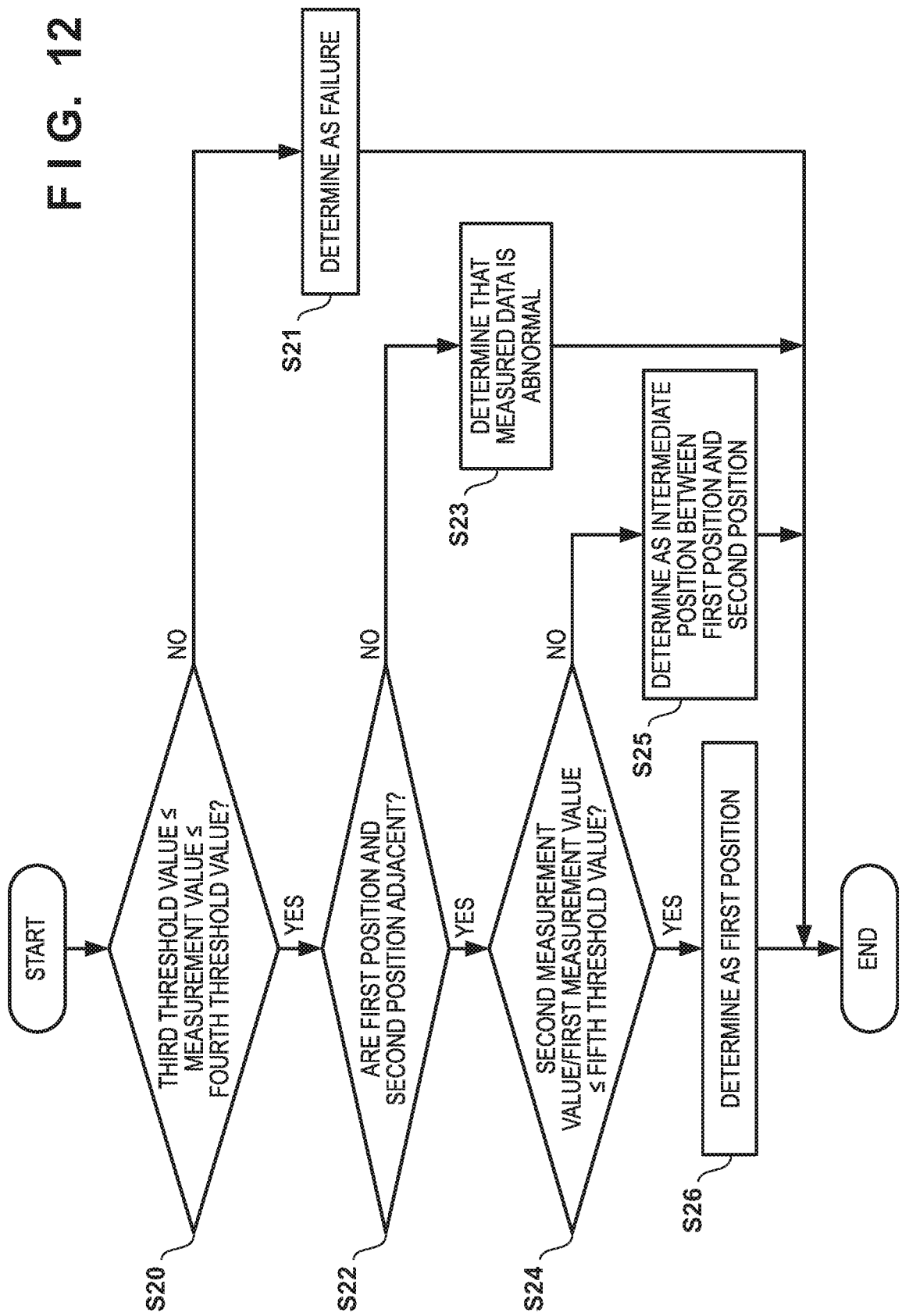

MOTOR CONTROL APPARATUS THAT PERFORMS FAILURE DETERMINATION AND DETERMINATION OF ROTATIONAL POSITION OF ROTOR, AND IMAGE FORMING APPARATUS

BACKGROUND OF THE INVENTION

Field of the Invention

The present invention relates to technology for controlling a motor, and in particular relates to technology for failure determination of a motor to be controlled.

Description of the Related Art

A sensorless DC brushless motor (hereinafter, referred to as "sensorless motor") that does not include a sensor for detecting the rotor position is used as a driving source of a rotating member in an image forming apparatus. Even when a sensorless motor does not rotate normally due to a failure or the like, the motor control apparatus cannot detect the failure of the motor until the driving of the motor is started in a sensorless drive mode. Therefore, Japanese Patent Laid-Open No. 2018-102064 discloses a method for determining whether or not a failure has occurred in a sensorless motor, by turning on/off a plurality of switching elements provided in a drive unit of the sensorless motor in accordance with a plurality of test patterns.

In the method disclosed in Japanese Patent Laid-Open No. 2018-102064, it is required to turn on/off a plurality of switching elements in accordance with a plurality of test patterns, which results in a longer downtime for failure determination processing.

SUMMARY OF THE INVENTION

According to an aspect of the present invention, a motor control apparatus includes: an excitation unit configured to excite a plurality of excitation phases of a motor; a measurement unit configured to measure a physical amount that changes according to an inductance of at least one of a plurality of coils that make up the plurality of excitation phases by exciting each of the plurality of excitation phases, and generate measured data that includes measurement values of the physical amount measured for the plurality of excitation phases; and a determination unit configured to determine, based on the measured data, a rotational position of a rotor of the motor and whether or not at least one of the motor and the excitation unit has a failure.

Further features of the present invention will become apparent from the following description of exemplary embodiments with reference to the attached drawings.

BRIEF DESCRIPTION OF THE DRAWINGS

FIGS. 4A and 4B are diagrams illustrating a configuration of a motor according to an embodiment.

FIGS. 6A to 6C are diagrams illustrating measured data according to an embodiment.

FIG. 9 is a flowchart of processing for determining a rotor position that includes failure determination processing according to an embodiment.

FIG. 12 is a flowchart of processing for determining a rotor position that includes failure determination processing according to an embodiment.

DESCRIPTION OF THE EMBODIMENTS

Figure 1:
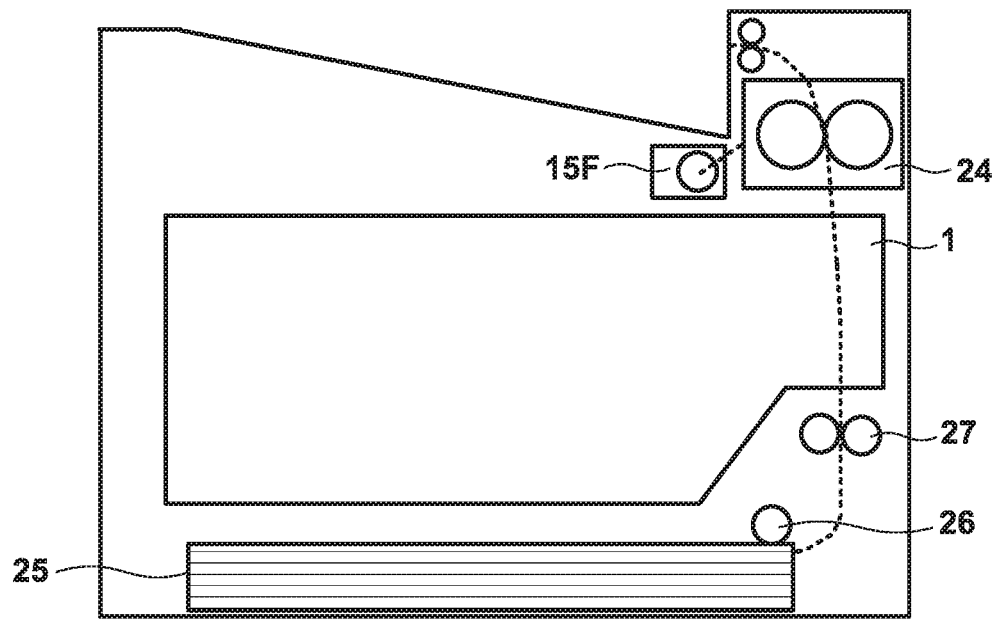
FIG. 1 is a diagram illustrating a configuration of an image forming apparatus according to an embodiment.

Embodiments will be described below in detail with reference to the attached drawings. Note that the following embodiments do not limit the invention according to the scope of the claims. A plurality of features are described in the embodiments, but all of these features are not necessarily essential to the invention, and a plurality of features may be suitably combined. Furthermore, in the attached drawings, the same reference numerals are assigned to the same or similar configurations, and an overlapping description is omitted.

First Embodiment

FIG. 1 is a diagram illustrating a configuration of an image forming apparatus according to the present embodiment. The image forming apparatus may be one of a printing apparatus, a printer, a copier, a multi-function peripheral, and a facsimile. A sheet stored in a sheet feeding cassette 25 of the image forming apparatus is conveyed along a conveyance path by a sheet feeding roller 26 and a conveyance roller 27. An image forming unit 1 forms yellow, magenta, cyan, and black toner images, and transfers these toner images to a sheet that is conveyed on the conveyance path. A fixing device 24 includes a heating roller and a pressure roller, and fixes the toner images on the sheet by applying heat and pressure to the sheet on which the toner images are transferred. The sheet subjected to processing for fixing the toner images is discharged to the outside of the image forming apparatus. A motor 15F is a driving source for rotating rollers of the fixing device 24.

Figure 2:
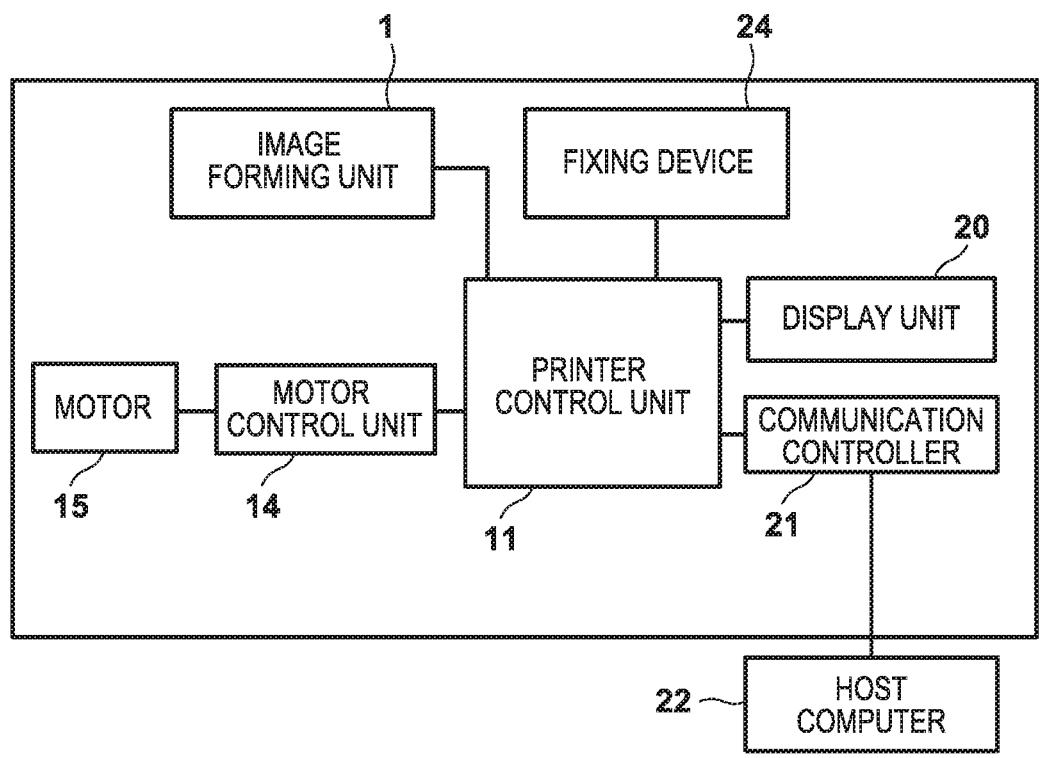
FIG. 2 is a diagram illustrating a control configuration of the image forming apparatus according to an embodiment.

FIG. 2 shows a control configuration of the image forming apparatus. A printer control unit 11, upon receiving image data of an image to be formed from a host computer 22 via a communication controller 21, forms a toner image on a sheet by controlling the image forming unit 1, and fixes the toner image on the sheet by controlling the fixing device 24. Also, here, the printer control unit 11 controls motors 15 including the motor 15F by controlling a motor control unit 14, and performs conveyance control of sheets and the like. Also, the printer control unit 11 displays the status of the image forming apparatus in a display unit 20. Note that the printer control unit 11 includes a microcomputer and a memory. The memory stores various types of control programs and data, and the microcomputer controls the units of the image forming apparatus based on the various types of control programs and data stored in the memory.

Figure 3:
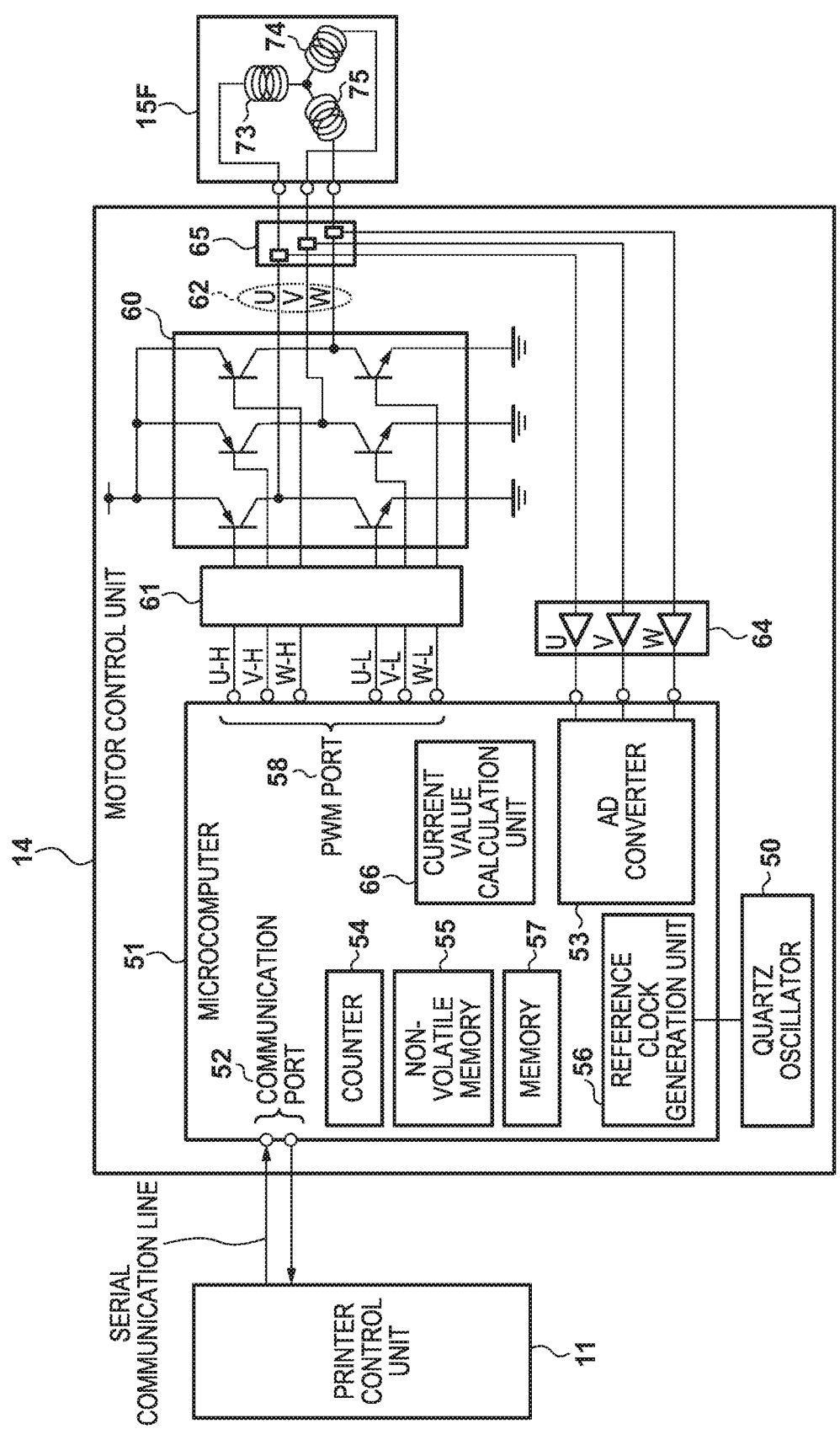
FIG. 3 is a diagram illustrating a configuration of a motor control unit according to an embodiment.

FIG. 3 shows the details of control configuration of the motor 15F. The motor control unit 14 includes a microcomputer 51. The microcomputer 51 communicates with the printer control unit 11 via a communication port 52. Also, a reference clock generation unit 56 of the microcomputer 51 is connected to a quartz oscillator 50, and generates a reference clock based on an output of the quartz oscillator 50. A counter 54 performs a count operation based on the reference clock. The reference clock is used to measure the cycle of input pulse, and to generate a PWM signal, and the like. The microcomputer 51 includes a nonvolatile memory 55 and a volatile memory 57 for storing various data used for controlling the motor 15F and the like. The microcomputer 51 outputs a pulse width modulation signal (PWM signal) from a PWM port 58. In the present embodiment, the microcomputer 51 outputs six PWM signals in total, namely high-side PWM signals (U-H, V-H, W-H) and low-side PWM signals (U-L, V-L, W-L) for respective three phases (U, V, W) of the motor 15F. Therefore, the PWM port 58 has six terminals U-H, V-H, W-H, U-L, V-L, and W-L.

Terminals of the PWM port 58 are connected to a gate driver 61, and the gate driver 61 controls ON/OFF of switching elements of an inverter 60 for three phases based on the PWM signals. Note that the inverter 60 includes six switching elements, namely three high-side switching elements and three low-side switching elements for respective three phases, and the gate driver 61 controls the six switching elements based on the corresponding PWM signals. A transistor or an FET can be used as the switching element, for example. In the present embodiment, when the PWM signal is at a high level, the corresponding switching element is turned on, and when the PWM signal is at a low level, the corresponding switching element is turned off. Outputs 62 of the inverter 60 are connected to coils 73 (U phase), 74 (V phase), and 75 (W phase) of the motor. As a result of controlling ON/OFF of the respective switching elements of the inverter 60, excitation currents (coil currents) of the respective coils 73, 74, and 75 can be controlled. As described above, the gate driver 61, and the inverter 60 function as an excitation unit that excites the plurality of coils 73, 74, and 75.

Current sensors 65 output detection voltages corresponding to the values of excitation currents that flow through the coils 73, 74, and 75, respectively. Amplifier units 64 amplify detection voltages of respective phases, apply an offset voltage, and output the resultant voltages to an analog to digital converter (AD converter) 53. The AD converter 53 converts the amplified detection voltages to digital values. A current value calculation unit 66 determines the excitation currents of the respective phases based on output values (digital values) of the AD converter 53. For example, assume that the current sensor 65 outputs a voltage of 0.01 V per 1 A, the amplification factors (gains) of the amplifier units 64 are 10, and the offset voltage applied by the amplifier units 64 are 1.6 V. If the excitation current flowing through the motor 15F is in a range of −10 A to +10 A, the voltages to be output from the amplifier units 64 are in a range of 0.6 V to 2.6 V. For example, if the AD converter 53 converts voltages of 0 to 3 V to digital values of 0 to 4095, and outputs the converted digital value, the excitation currents of −10 A to +10 A are approximately converted to digital values of 819 to 3549. Note that the excitation currents flowing in a direction from the inverter 60 to the motor 15F are assumed to have positive current values, and the excitation currents flowing in the opposite direction are assumed to have negative current values.

The current value calculation unit 66 obtains an excitation current by reducing an offset value corresponding to the offset voltage from a digital value, and multiplying the resultant digital value by a predetermined conversion factor. In this example, the offset value corresponding to the offset voltage (1.6 V) is about 2184 (1.6×4095/3). Also, the conversion factor is about 0.000733 (3/4095). The conversion factor is stored in the nonvolatile memory 55 in advance. Note that the offset value corresponds to a digital value when there is no excitation current, and thus a configuration can be adopted in which the offset value is stored in the nonvolatile memory 55, and is read out therefrom when used. As described above, the current sensors 65, the amplifier units 64, the AD converter 53, and the current value calculation unit 66 constitute a current measurement unit.

FIGS. 4A and 4B are diagrams illustrating a configuration of the motor 15F. The motor 15F includes a stator 71 having six slots and a rotor 72 having four poles. The stator 71 includes the coils of respective phases 73, 74, and 75. The rotor 72 is constituted by permanent magnets, and includes two sets of N and S poles. The stopping position of the rotor 72 is determined depending on an excitation phase. Note that, in the present embodiment, the excitation phase is indicated by a series of two coils of the plurality of coils 73, 74, and 75. That is, there are six excitation phases U-V, U-W, V-U, V-W, W-U, and W-V. Here, the excitation in the U-V phase means that an excitation current is caused to flow from the U-phase coil 73 to the V-phase coil 74 with respect to the series connection of the U-phase coil 73 the V-phase coil 74. For example, when the U-V phase is excited, the rotor 72 stops at the rotational position shown in FIG. 4A. Note that, here, the U phase induces an N pole, and the V phase induces an S pole. Then, when the U-W phase is excited, the rotor 72 stops at a rotational position shown in FIG. 4B.

When the driving of the motor 15F is stopped, and the excitation current is reduced to 0, force to hold the rotor 72 is no longer exerted on the rotor 72, and if an external rotative force is applied to the rotor 72, the rotor 72 rotates. Therefore, when the fixing device 24 is attached to or removed from the image forming apparatus, or when a sheet caught in the fixing device 24 due to jamming is removed, the rotor 72 may rotate. At this time, the motor control unit 14 cannot determine the stopping position of the rotor 72. Also, immediately after the power supply to the image forming apparatus is turned on, the motor control unit 14 cannot determine the stopping position of the rotor 72. Therefore, when the rotation of the motor 15F is started, first, the motor control unit 14 needs to perform processing for detecting the stopping position of the rotor 72.

Here, in general, a coil such as the coil 73, 74, or 75 has a configuration in which a copper wire is wound around a core that is formed by stacking electromagnetic steel sheets. Also, the magnetic permeability of an electromagnetic steel sheet decreases when an external magnetic field is present. The inductance of a coil is proportional to the magnetic permeability of a core, and therefore when the magnetic permeability of the core decreases, the inductance of the coil also decreases. For example, because the U-phase coil 73 in FIG. 4A opposes only an S pole of the rotor 72, the degree of reduction in inductance of the U-phase coil 73 is larger than that of the W-phase coil 75 that opposes both an S pole and an N pole of the rotor 72. Also, the amount of change in inductance differs depending on whether or not the direction of a magnetic field generated by an excitation current is the same as the direction of an external magnetic field. Specifically, in a state in FIG. 4A, when an excitation current is caused to flow such that the direction of the magnetic field generated by the U-phase coil 73 is the same as the magnetic field generated by the opposing S pole of the rotor 72, that is, the U phase is an N pole, the amount of reduction in inductance increases relative to a case where the excitation current is caused to flow in a direction such that the U phase is an S pole. As described above, the detected inductance differs depending on the stopping position of the rotor 72 and the excitation phase.

Figure 5A:
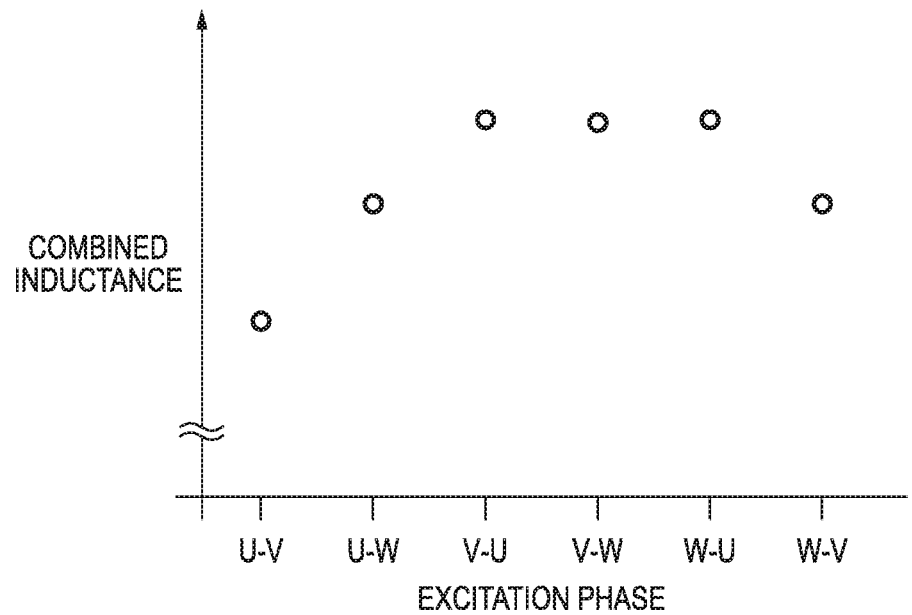
FIG. 5A is a diagram illustrating a relationship between an excitation phase and a combined inductance according to an embodiment.

FIG. 5A shows an example of the combined inductance at each excitation phase when the rotor 72 stops. Note that FIG. 5A shows the combined inductance when the rotor 72 is at a position at which the rotor 72 stops when the U-V phase is excited. Hereinafter, the position at which the rotor 72 stops when the X-Y phase is excited is referred to as a "position at the X-Y phase". Since the rotor 72 stops at the position of the U-V phase, the combined inductance when the U-V phase is excited is smaller than the combined inductance when another phase is excited. Therefore, if the relative magnitudes of the combined inductance (combined impedance) at the respective excitation phases are known, the position of the rotor 72 can be determined. Note that, when the rotor 72 stops at an intermediate position between the position at the U-V phase and the position at the U-W phase, the values of combined inductances of the U-V phase and the U-W phase are substantially the same, and are smaller than the combined inductances of other excitation phases.

In the present embodiment, the excitation phases are sequentially excited, relative magnitudes of the combined inductances at the respective excitation phases are determined from the excitation currents that flow when the respective excitation phases are excited, and the rotor stopping position is detected from the determined result. For example, if a combined inductance detected when the U-V phase is excited is smaller than the combined inductances detected when other excitation phases are excited, it can be determined that the rotor 72 is stopped at the position at the U-V phase. Also, if combined inductances detected when the U-V phase and the U-W phase are excited are substantially the same, and are smaller than the combined inductances detected when other excitation phases are excited, it can be determined that the rotor 72 stops at a position between the U-V phase and the U-W phase. In other words, if a combined inductance detected when one of the excitation phases is excited is smaller than the combined inductances detected when other excitation phases are excited, it is determined that the rotor 72 stops at the position at this excitation phase. In addition, if combined inductances detected when two excitation phases adjacent to each other with respect to the electrical angle are excited are substantially the same, and are smaller than the combined inductances detected when other excitation phases are excited, it is determined that the rotor 72 stops at a position between the two excitation phases.

Note that two excitation phases adjacent to each other with respect to the electrical angle are also excitation phases that are adjacent in the excitation order when the rotor 72 is rotated. Specifically, when the rotor 72 of the present embodiment is rotated, the motor control unit 14 excites U-V, U-W, V-W, V-U, W-U, W-V, and U-V in the stated order. In this order, two consecutive excitation phases are two excitation phases adjacent to each other with respect to the electrical angle. For example, the V-W phase and the W-U phase are excitation phases adjacent to the V-U phase.

Figure 5B:
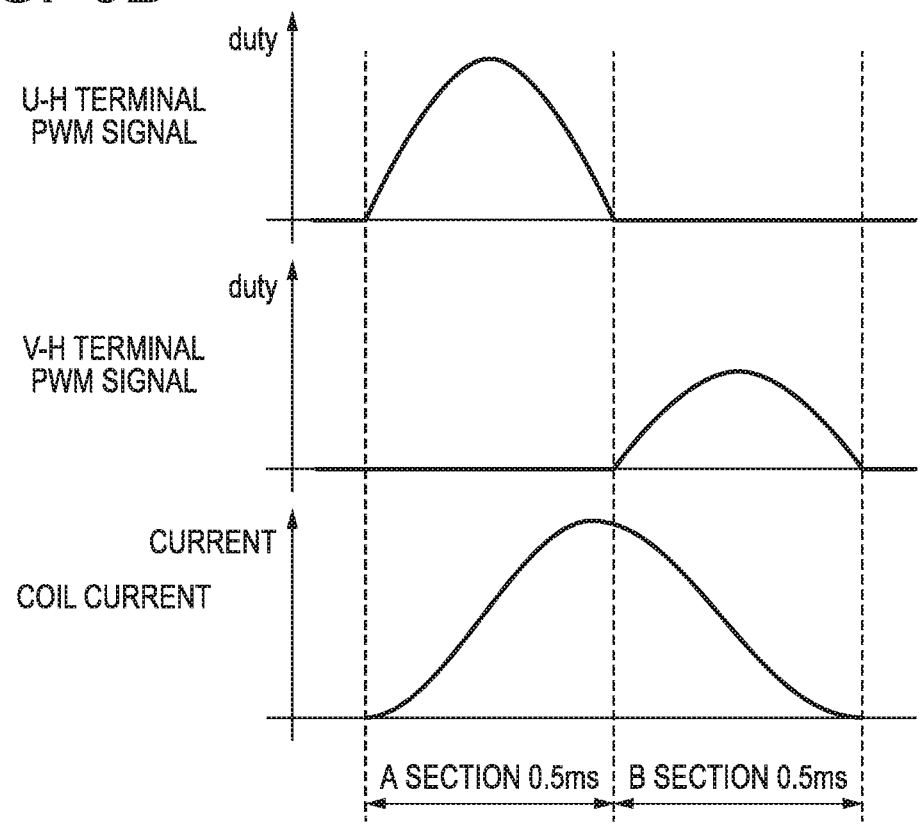
FIG. 5B is a diagram illustrating PWM signals and coil current waveforms during excitation according to an embodiment.

An excitation method for detecting a combined inductance will be described below. First, when exciting the U-V phase, PWM signals whose duty ratio changes overtime are output from a U-H terminal and a V-H terminal of the PWM port 58, as shown in FIG. 5B. Specifically, during an A period (first period), the duty ratio of the PWM signal that is output from the U-H terminal is changed sinusoidally. Note that the half cycle of this sine wave corresponds to the length of the A period, and the maximum value of the amplitude is set to 80%, for example. Note that, during the A period, a V-L terminal is set to a high level (duty ratio is 100%), and one end of the V-phase coil is connected to a predetermined potential (ground). Note that the other terminals are set to a low level (duty ratio is 0%). During a B period (second period) that follows the A period, the duty ratio of the PWM signal that is output from the V-H terminal is changed sinusoidally. The half cycle of this sine wave also corresponds to the length of the B period, and the maximum value of the amplitude is set to 50%, for example. Note that, during the B period, a U-L terminal is set to a high level (duty ratio is 100%), and one end of the U-phase coil is connected to a predetermined potential (ground). Note that the other terminals are set to a low level (duty ratio is 0%). The time lengths of the A period and the B period are determined using a period during which the rotor 72 does not rotate as an upper limit, based on the required detection accuracy. In this example, the time lengths are set to 0.5 ms. In addition, the maximum value of duty ratio during the A period is determined such that the detection accuracy required for an excitation current that flows during the A period is secured. Also, the maximum value of duty ratio during the B period is set such that the integrated value of a voltage that occurs in the inductance component of each coil over the A period and the B period is about zero. In other words, the maximum value of duty ratio during the B period is determined based on a voltage that is applied to the coil during the A period.

By performing setting in this manner, as illustrated as a coil current in FIG. 5B, the excitation current smoothly decreases during the B period, and reaches about zero at the end of the B period. If measurement of the excitation phase of next series of two coils is started in a state where an excitation current flows, a current value in the measurement is affected. Therefore, in order to accurately detect a rotor stopping position, it is necessary to start measurement of the next excitation phase after the excitation current in the previous measurement has decreased sufficiently. In the present embodiment, the excitation current is about zero at the end of the B period, and thus it is possible to accurately detect a rotor stopping position, and reduce a waiting time for measurement of the next excitation phase.

The motor control unit 14 excites the excitation phases for a predetermined period, in processing for detecting a stopping position of the rotor 72, detects the largest value of the excitation currents (coil currents) as a measurement value, and stores it in the memory 57. Note that, in the present embodiment, a predetermined period is a period acquired by totaling the A section and the B section shown in FIG. 5B. Thus, regarding the six excitation phases, the largest values of excitation currents are respectively obtained as measurement values, which are stored in the memory 57 as measured data. FIGS. 6A to 6C show examples of measured data indicating measurement values for the respective excitation phases measured in this manner. Note that FIGS. 6A to 6C show examples of measured data when the rotor 72 is stopped at the position at the U-V phase, the position at the U-W phase, and a position between the position at the U-V phase and the position at the U-W phase. Here, the smaller the combined inductance of a coil is, the larger the measurement value becomes, and thus the measured data in FIGS. 6A to 6C also indicates the magnitude relationship of combined inductances when the excitation phases are excited.

Figure 7A:
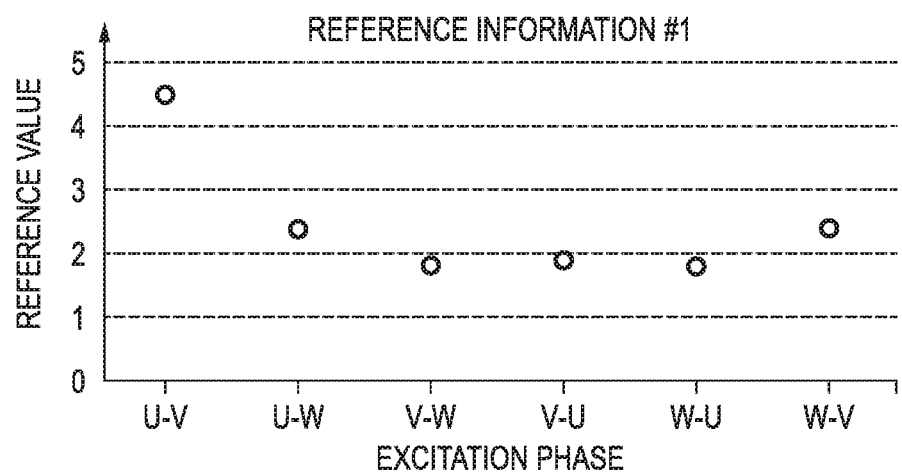
FIGS. 7A to 7F are diagrams illustrating reference information according to an embodiment.
Figure 7B:
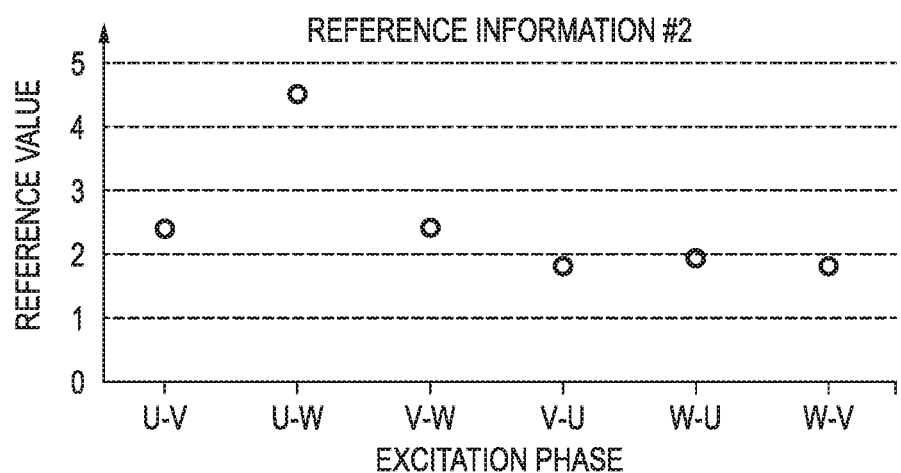
Figure 7C:
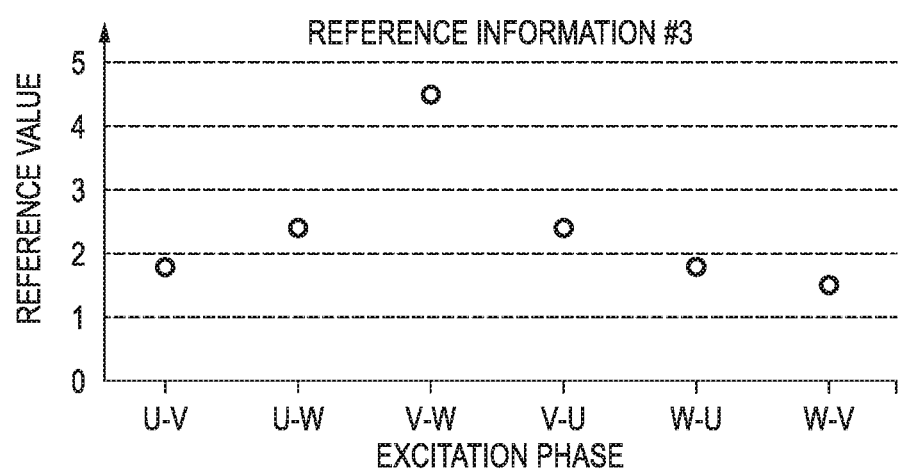
Figure 7D:
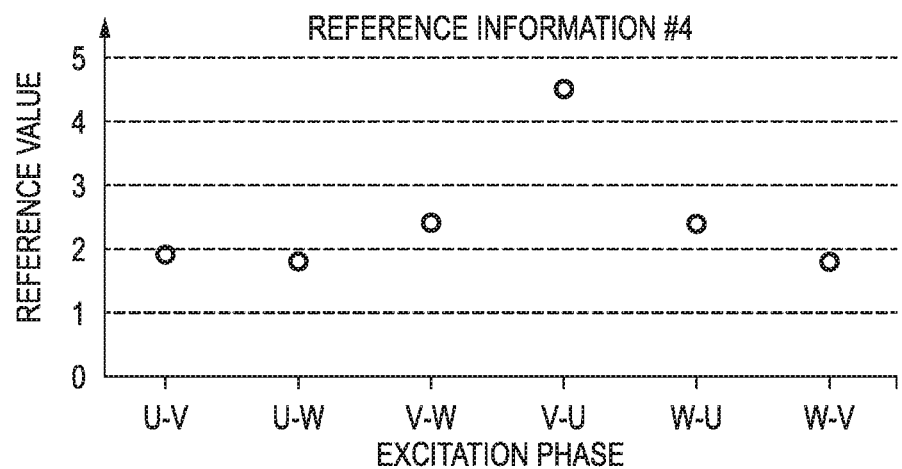
Figure 7E:
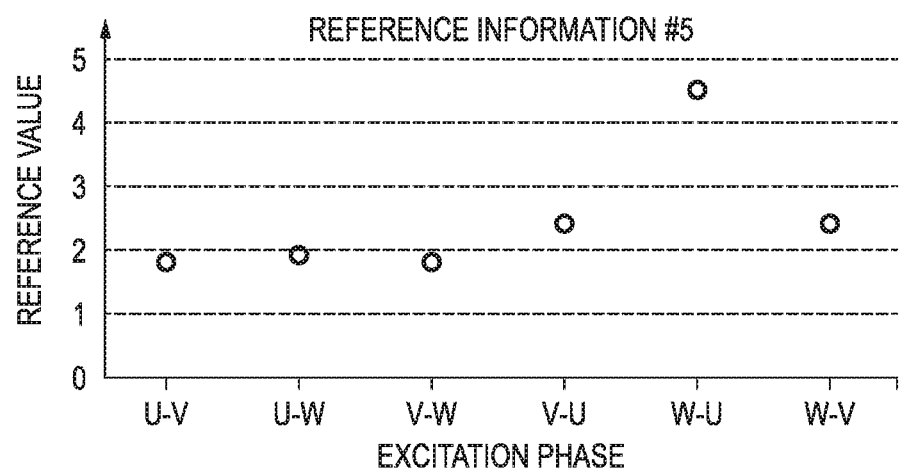
Figure 7F:
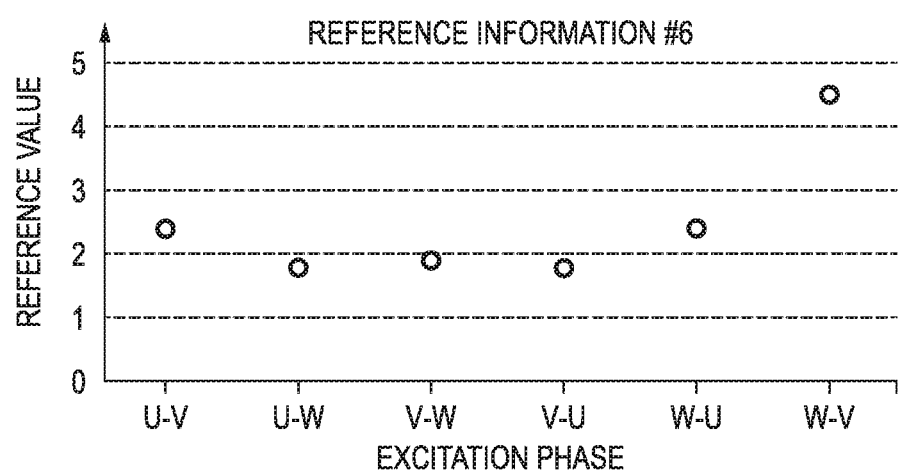

FIGS. 7A to 7F show reference information stored in the nonvolatile memory 55 in advance. Note that FIG. 7A shows reference information when the rotor 72 is stopped at the position at the U-V phase, and the reference information is hereinafter referred to as reference information #1. FIG. 7B shows reference information when the rotor 72 is stopped at the position at the U-W phase, and the reference information is hereinafter referred to as reference information #2. FIG. 7C shows reference information when the rotor 72 is stopped at the position at the V-W phase, and the reference information is hereinafter referred to as reference information #3. FIG. 7D shows reference information when the rotor 72 is stopped at the position at the V-U phase, and the reference information is hereinafter referred to as reference information #4. FIG. 7E shows reference information when the rotor 72 is stopped at the position at the W-U phase, and the reference information is hereinafter referred to as reference information #5. FIG. 7F shows reference information when the rotor 72 is stopped at the position at the W-V phase, and the reference information is hereinafter referred to as reference information #6. The reference information for each of the rotor stopping positions is information indicating a reference value for the largest value of excitation current of the corresponding excitation phase when the rotor is stopped at the position at the excitation phase. The reference value is an average value of measured largest current values.

Figure 8A:
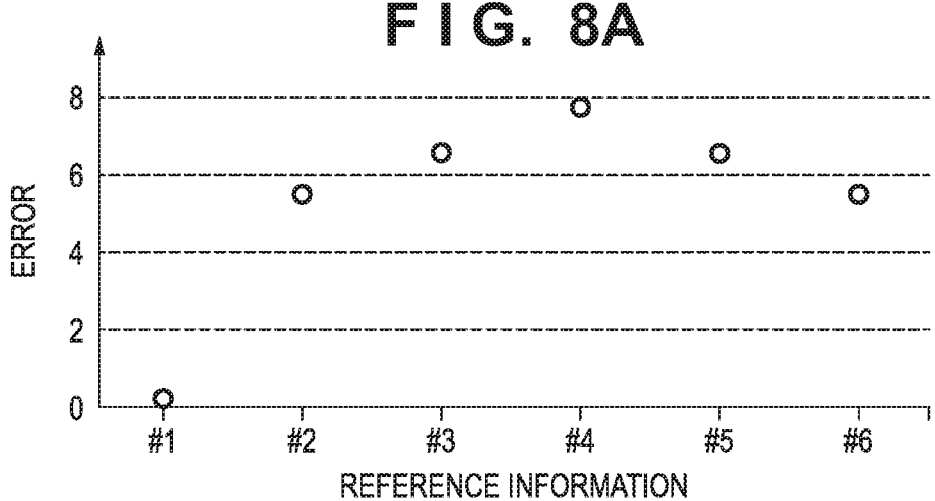
FIGS. 8A to 8C are diagrams illustrating errors between reference information and measured data according to an embodiment.
Figure 8B:
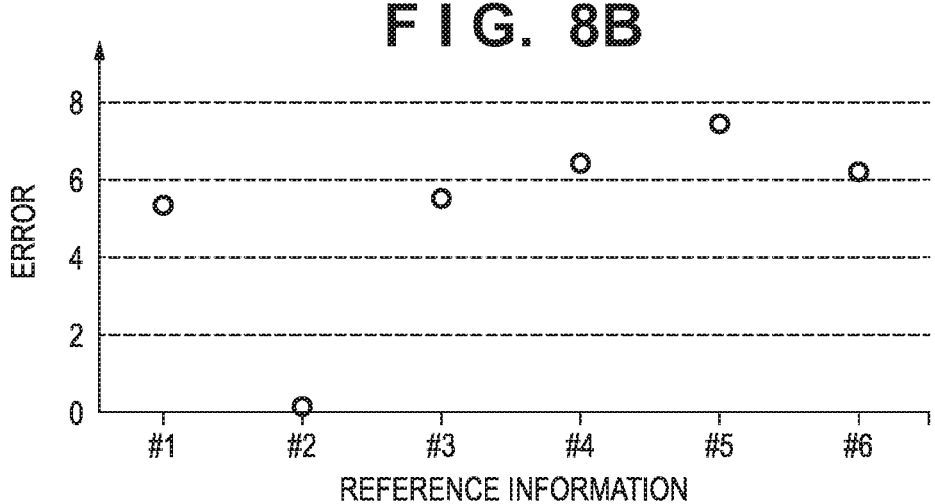
Figure 8C:
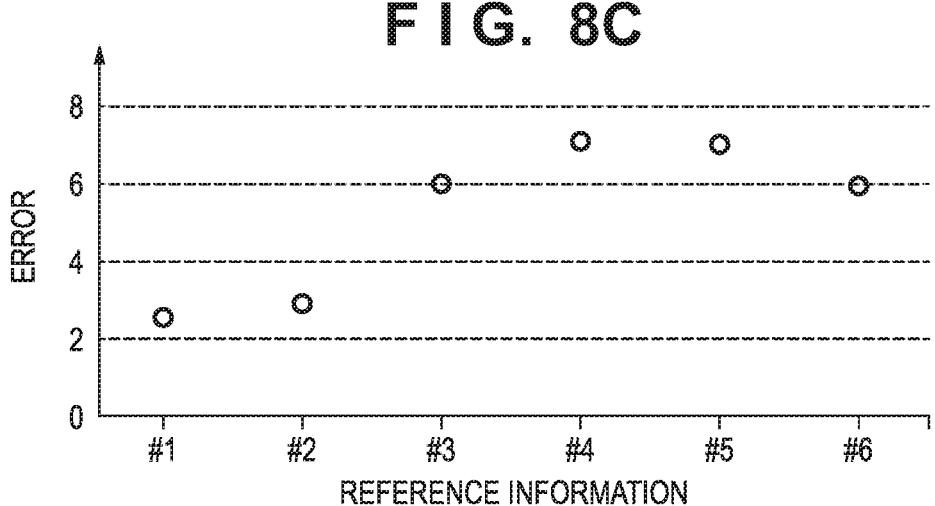

The motor control unit 14 compares measured data with each reference information, and calculates an error relative to the reference information. Specifically, when obtaining an error relative to the reference information #1 in FIG. 7A, a difference (absolute value) between a measurement value of each excitation phase and the reference value of the same excitation phase indicated by the reference information #1 is obtained, and the total of the differences of the six excitation phases is obtained, and this is defined as an error relative to the reference information #1. In other words, an error of measured data relative to the reference information #1 is the integration value of errors of measurement values relative to the respective reference values of the excitation phases indicated by reference information. As described above, the motor control unit 14 obtains errors of measured data relative to the respective reference information #1 to 6. FIGS. 8A to 8C show errors of the measured data in FIGS. 6A to 6C relative to the reference information #1 to 6. Note that the reference information #1 to 6 are shown in FIGS. 7A to 7F.

In FIG. 8A, the error relative to the reference information #1 is the smallest. The reference information #1 is reference information for a case where the rotor 72 is stopped at the position at the U-V phase, and thus the motor control unit 14 determines, from FIG. 8A, that the rotor 72 is stopped at the position at the U-V phase. In FIG. 8B, the error relative to the reference information #2 is the smallest. The reference information #2 is reference information for a case where the rotor 72 is stopped at the position at the U-W phase, and thus the motor control unit 14 determines, from FIG. 8B, that the rotor 72 is stopped at the position at the U-W phase. On the other hand, in FIG. 8C, the errors relative to the reference information #1 and 2 are substantially the same, and are smaller than the other errors. The reference information #1 is reference information for a case where the rotor 72 is stopped at the position at the U-V phase, and the reference information #2 is reference information for a case where the rotor 72 is stopped at the position at the U-W phase. Therefore, the motor control unit 14 determines, from FIG. 8C, that the rotor 72 is stopped between the position at the U-W phase and the position at the U-W phase.

As described above, the motor control unit 14 determines the stopping position of the rotor 72 using reference information pieces respectively corresponding to the plurality of rotational positions of the rotor 72, but, in the present embodiment, in the processing for determining the stopping position of the rotor 72, failure determination of the motor 15F that includes an excitation unit is performed. Note that the excitation unit is a functional block that includes the inverter 60, and supplies excitation currents to the motor 15F. Accordingly, in the present embodiment, a failure of at least one of the excitation unit and the motor 15F is detected. However, in the following description, this processing for determining whether or not at least one of the excitation unit and the motor 15F has a failure is simply referred to as failure determination of the motor 15F. FIG. 9 is a flowchart of processing for determining a stopping position of the rotor 72 that includes failure determination processing of the motor 15F, according to the present embodiment. Note that, in the following description, reference information relative to which an error of measured data is the smallest is referred to as first reference information, and reference information relative to which an error of measured data is the second smallest is referred to as second reference information. In addition, an error of measured data relative to the first reference information is referred to as a first error, and an error of measured data relative to the second reference information is referred to as a second error. Furthermore, the rotational position of the rotor 72 corresponding to the first reference information is referred to as a first position, and the rotational position of the rotor 72 corresponding to the second reference information is referred to as a second position.

In step S10, the motor control unit 14 determines whether or not the first error is smaller than or equal to a predetermined first threshold value. If the first error is larger than the first threshold value, the motor control unit 14 determines in step S11 that the motor 15F has a failure. For example, if any one of the coils 73 to 75 short-circuits or is disconnected, a measurement value deviates from a reference value in a large amount, and thus an error also increases. Therefore, a determination on a failure of the motor 15F can be made by appropriately setting the first threshold value. If the first error is smaller than or equal to the first threshold value, the motor control unit 14 determines whether or not the first position and the second position are adjacent to each other with respect to the electrical angle. If the first position and the second position are not adjacent to each other with respect to the electrical angle, the motor control unit 14 determines, in step S13, that measured data is abnormal. This is because, as shown in FIGS. 6A and 6B, if the first position and the second position are adjacent to each other with respect to the electrical angle, and if the first position and the second position obtained from measured data are not adjacent to each other with respect to the electrical angle, it can be determined that there is a problem with the measured data.

If the first position and the second position are adjacent, the motor control unit 14 determines, in step S14, whether or not the value of the ratio of the first error to the second error is smaller than or equal to a predetermined second threshold value. If the value of the ratio of the first error to the second error is larger than the predetermined second threshold value, the motor control unit 14 determines, in step S15, that the rotor 72 is stopped between the first position and the second position. If the value of the ratio of the first error to the second error is smaller than or equal to the predetermined second threshold value, the motor control unit 14 determines, in step S16, that the stopping position of the rotor 72 is the first position. This is because, as shown in FIGS. 8A to 8C, if the rotor 72 is stopped at a position corresponding to an excitation phase, the first error is smaller than the second error, and if the rotor 72 is stopped between two excitation phases adjacent to each other with respect to the electrical angle, the first error and the second error have substantially the same value. Note that, in step S10 of FIG. 9, if the first error is the same as the first threshold value, it is determined that the motor 15F does not have a failure, but a configuration may also be adopted in which, if the first error is the same as the first threshold value, it is determined that the motor 15F has a failure. Similarly, in step S15 in FIG. 9, if the value of the ratio is equal to the second error, it is determined that the rotational position of the rotor 72 is the first position, but a configuration may also be adopted in which, if the value of the ratio is equal to the second error, it is determined that the rotational position of the rotor 72 is between the first position and the second position.

For example, the first threshold value is set to 5.0, and the second threshold value is set to 0.8. The first error and the second error in FIG. 8A are respectively 0.28 and 5.54, and the first position is the position at the U-V phase, and the second position is the position at the U-W phase. Since the first error is 0.28, and is smaller than the first threshold value of 5.0, the decision in step S10 is "Yes". Since the position at the U-V phase and the position at the U-W phase are adjacent, the decision in step S12 is "Yes". Since the value of the ratio of the first error to the second error is 0.05, and is smaller than the second threshold value of 0.8, the decision in step S14 is "Yes". Therefore, the motor control unit 14 determines, in step S16, that the stopping position of the rotor 72 is the first position, in other words, the position at the U-V phase. In addition, the first error and the second error in FIG. 8C are 2.63 and 2.97, the first position is the position at the U-V phase, and the second position is the position at the U-W phase. Since the first error is 2.63, and is smaller than the first threshold value of 5.0, the decision in step S10 is "Yes". Since the position at the U-V phase and the position at the U-W phase are adjacent, the decision in step S12 is "Yes". Since the value of the ratio of the first error to the second error is 0.88, and is larger than the second threshold value of 0.8, the decision in step S14 is "No". Therefore, the motor control unit 14 determines, in step S15, that the stopping position of the rotor 72 is between the first position and the second position, in other words, between the position at the U-V phase and the position at the U-W phase.

Figure 10A:
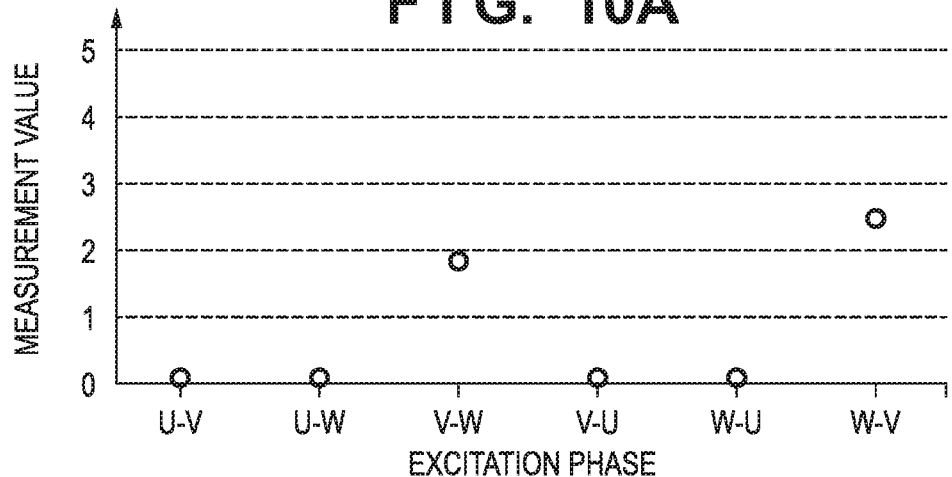
FIGS. 10A to 10C are diagrams illustrating measured data according to an embodiment.
Figure 10B:
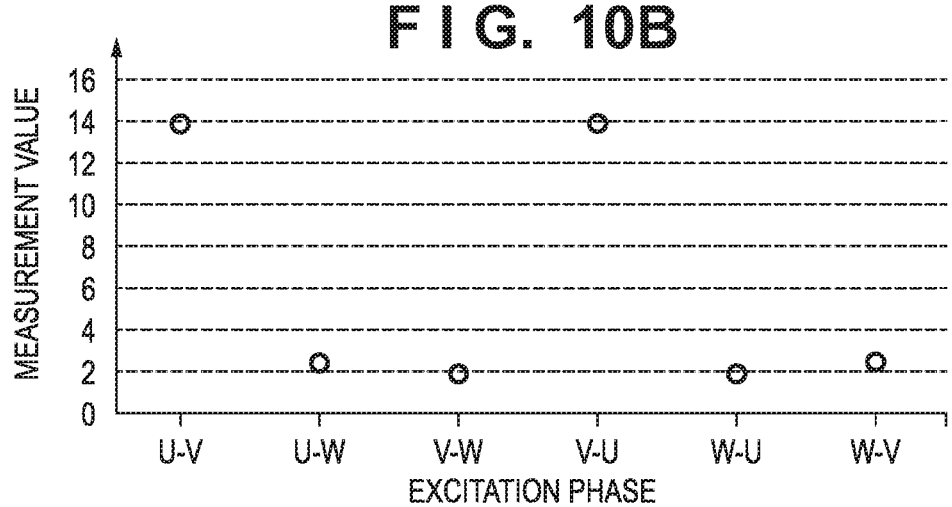
Figure 10C:
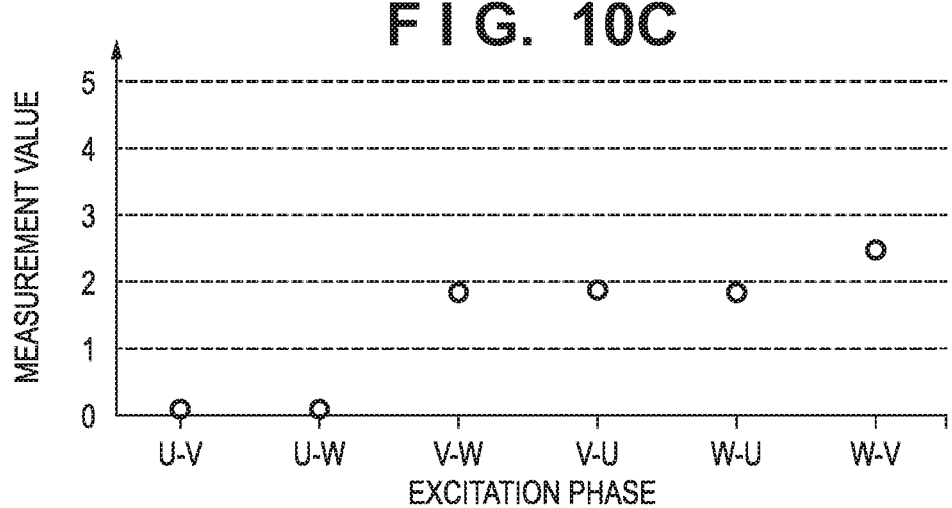
Figure 11A:
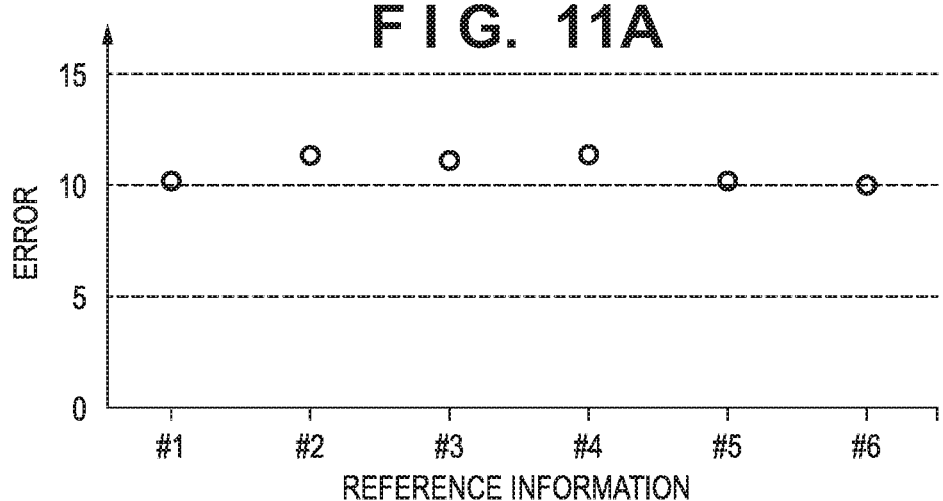
FIGS. 11A to 11C are diagrams illustrating errors between reference information and measured data according to an embodiment.
Figure 11B:
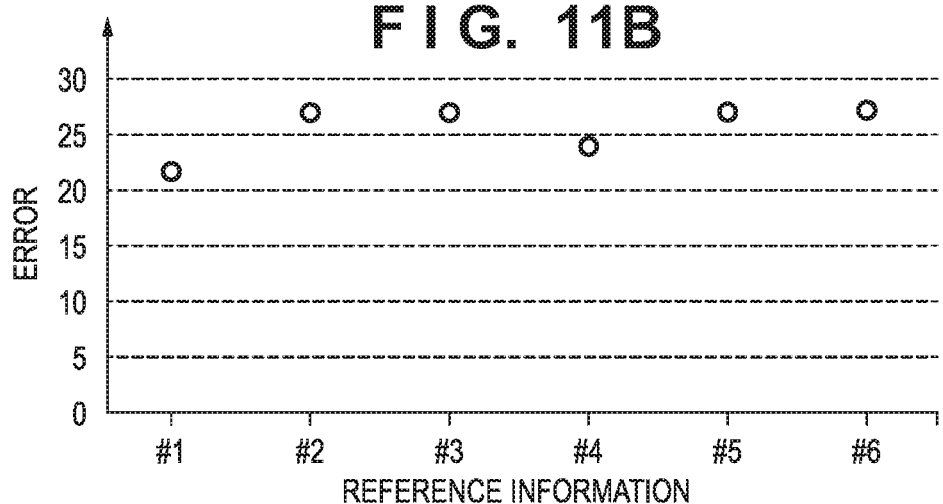
Figure 11C:
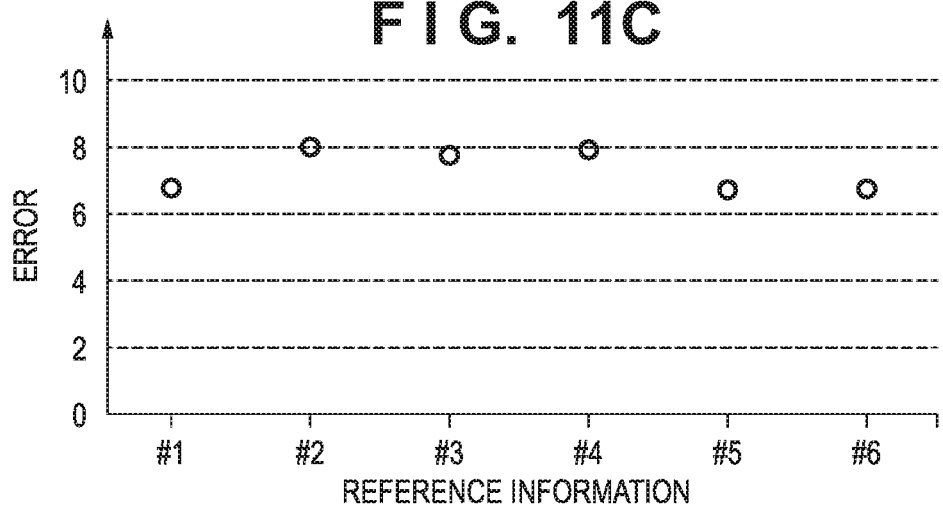

FIGS. 10A to 10C show examples of a measurement result when the excitation unit or the motor 15F has a failure. Note that FIG. 10A shows a case where the U-phase coil 73 is disconnected, FIG. 10B shows a case where the U-phase coil 73 and the V-phase coil 74 short-circuit, and FIG. 10C shows a case where the U-phase high-side FET has an open failure. FIGS. 11A to 11C show errors between the measured data in FIGS. 10A to 10C relative to the reference information pieces. The first errors in FIGS. 11A to 11C are respectively 10.11, 21.80, and 6.74, and are larger than the first threshold value of 5.0, and thus the decision in step S10 is "No". Therefore, the motor control unit 14 determines, in step S11, that at least one of the motor 15F and the excitation unit has a failure.

As described above, in the present embodiment, the failure determination of the motor 15F is performed in the processing for determining a rotor stopping position. Note that the failure determination of the motor 15F is performed using only information that is measured in order to determine the rotor stopping position. Therefore, the failure determination of the motor 15F can be performed without increasing a downtime of the image forming apparatus for failure determination.

Note that, in the present embodiment, the inductance of at least one of the coils 73 to 75 is determined based on the largest value of excitation currents. However, by measuring any physical amount that changes according to the inductance, it is possible to determine the magnitude relationship of inductances when the excitation phases are excited. For example, a configuration can be adopted in which the integration value of excitation currents when excitation phases are excited for a predetermined period is measured. Also, a configuration can be adopted in which the speed of a change in an excitation current when an excitation phase is excited is measured. Note that the speed of a change in an excitation current can be represented by a value of the excitation current after a predetermined period from when an excitation phase was excited. Furthermore, a time from when an excitation phase was excited until an excitation current reaches a predetermined value can be used as an index that indicates the speed of change in the excitation current.

Second Embodiment

Next, a second embodiment will be described with a focus on differences from the first embodiment. In the present embodiment, the reference information shown in FIGS. 7A to 7F is not used. FIG. 12 is a flowchart of processing for determining a stopping position of the rotor 72 that includes failure determination of the motor 15F, according to the present embodiment. Note that, in the following description, the largest measurement value in measured data is referred to as a first measurement value, and the second largest measurement value is referred to as a second measurement value. Furthermore, a position at which the rotor 72 stops when an excitation phase corresponding to the first measurement value is excited is referred to as a first position, and a position at which the rotor 72 stops when an excitation phase corresponding to the second measurement value is excited is referred to as a second position.

In step S20, the motor control unit 14 determines whether or not all of the measurement values of six respective excitation phases are within a predetermined range, more specifically, whether or not all of the measurement values are larger than or equal to a third threshold value, and are smaller than or equal to a fourth threshold value. The third threshold value is a threshold value for disconnection determination of the coils 73 to 75, and the fourth threshold value is a threshold value for short-circuiting determination of the coils 73 to 75, and is larger than the third threshold value. If six measurement values include a value that is not within the range of the third threshold value to the fourth threshold value, the motor control unit 14 determines in step S21 that the motor 15F has a failure. If the six measurement values are all within the range of the third threshold value to the fourth threshold value, the motor control unit 14 determines, in step S22, whether or not the first position and the second position are adjacent to each other with respect to the electrical angle. If the first position and the second position are not adjacent, the motor control unit 14 determines, in step S23, that the measured data is abnormal. If the first position and the second position are adjacent, the motor control unit 14 determines, in step S24, whether or not the value of the ratio of the second measurement value to the first measurement value is smaller than or equal to a predetermined fifth threshold value. If the value of the ratio of the second measurement value to the first measurement value is larger than the predetermined fifth threshold value, the motor control unit 14 determines in step S25 that the rotor 72 is stopped between the first position and the second position. If the value of the ratio of the second measurement value to the first measurement value is smaller than or equal to the predetermined fifth threshold value, the motor control unit 14 determines in step S26 that the stopping position of the rotor 72 is the first position.

For example, the third threshold value is set to 0.1, the fourth threshold value is set to 12, and the fifth threshold value is set to 0.8. In FIG. 6A, the measurement value of the U-V phase is the first measurement value=4.54, the measurement value of the U-W phase is the second measurement value=2.47, and the measurement values of the other excitation phases are about 2.0. In addition, the first position is the position at the U-V phase, and the second position is the position at the U-W phase. All of the measurement values are in the range of 0.1 to 12, and thus the decision in step S20 is "Yes". The positions at the U-V phase and the U-W phase are adjacent, and thus the decision in step S22 is "Yes". The value of the ratio of the second measurement value to the first measurement value is 0.54, and is smaller than the second threshold value of 0.8, and thus the decision in step S24 is "Yes". Therefore, the motor control unit 14 determines, in step S26, that the stopping position of the rotor 72 is the first position, in other words, the position at the U-V phase. In addition, in FIG. 6C, the measurement value of the U-V phase is the first measurement value=3.59, the measurement value of the U-W phase is the second measurement value=3.44, and the measurement values of other excitation phases are about 2.0. In addition, the first position is the position at the U-V phase, and the second position is the position at the U-W phase. All of the measurement values are within the range from 0.1 to 12, and thus the decision in step S20 is "Yes". Since the U-V phase and the U-W phase are adjacent, the decision in step S22 is "Yes". Since the value of the ratio of the second measurement value to the first measurement value is 0.96, and is larger than the second threshold value of 0.8, the decision in step S24 is "No". Therefore, the motor control unit 14 determines, in step S25, that the stopping position of the rotor 72 is between the first position and the second position, in other words between the position at the U-V phase and the position at the U-W phase.

Note that, also in the present embodiment, the largest value of excitation currents when the excitation phases are excited is used as a physical amount that changes according to an inductance. Here, as an inductance decreases, the largest value of excitation current increases. Therefore, processing in FIG. 12 is processing in a case where a physical amount whose value increases as the inductance decreases is used, and if a physical amount whose value decreases as the inductance decreases is used, determination on magnitude relationship in processes in FIG. 12 is reversed. Note that, more generally speaking, processing in FIG. 12 is as follows. First, the first measurement value is a measurement value indicating the smallest inductance, and the second measurement value is a measurement value indicating the second largest inductance. Processing in step S20 is for making a determination on short circuiting and disconnection of the motor 15F, and the determination is made based on whether or not all of the measurement values are in a first range regardless of a physical amount that is used for determination on the inductance. Here, if all of the measurement values are within the first range, it can be determined that the motor 15F is normal, otherwise it is determined that the motor 15F has a failure. There is no change in the processing in step S22.

Then, in processing in step S24, a determination is made as to whether or not the value of the ratio of the first measurement value to the second measurement value is within a second range. Here, if the value of the ratio of the first measurement value to the second measurement value is within the second range, the procedure advances to step S25, and if the value of the ratio of the first measurement value to the second measurement value is not within the second range, the procedure advances to step S26. This is because, if the rotor 72 is stopped between two adjacent excitation phases, measurement values when the two excitation phases are excited are similar, and the value of the ratio is in the vicinity of 1. On the other hand, when the rotor 72 is stopped at the position at a certain excitation phase, the difference between the first measurement value and the second measurement value increase, and thus, the value of the ratio is no longer in the vicinity of 1.

Other Embodiments

Note that the motor control unit 14 of the above embodiment can be implemented as a motor control apparatus. In addition, the motor control unit 14 and a portion of the printer control unit 11 involved in motor control can be implemented as a motor control apparatus. Furthermore, in the present embodiment, control of the motor 15F that drives the fixing device 24 has been described as an example, but the present invention can also be similarly applied to, for example, a motor that drives rollers that are involved in conveyance of sheets in the image forming apparatus. Similarly, the present invention can also be applied to a motor for rotating and driving a rotating member in the image forming unit 1 of the image forming apparatus.

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-008596, filed on Jan. 22, 2019, which is hereby incorporated by reference wherein in its entirety.

What is claimed is:

1. A motor control apparatus comprising:
an excitation unit configured to excite a plurality of excitation phases of a motor;
a measurement unit configured to measure a physical amount that changes according to an inductance of at least one of a plurality of coils that make up the plurality of excitation phases by exciting each of the plurality of excitation phases, and generate measured data that includes measurement values of the physical amount measured for the plurality of excitation phases;
a storage unit configured to store a plurality of pieces of reference information that respectively correspond to a plurality of rotational positions of a rotor of the motor, the plurality of pieces of reference information indicating reference values of the respective excitation phases; and
a determination unit configured to determine a rotational position of the rotor and whether or not at least one of the motor and the excitation unit has a failure, by comparing the measured data with the plurality of pieces of reference information,
wherein the determination unit determines a rotational position of the rotor and whether or not at least one of the motor and the excitation unit has a failure, by obtaining, for each of the plurality of pieces of reference information, an integration value of differences between reference values of the plurality of excitation phases indicated by the reference information and the measurement values of the corresponding excitation phases indicated by the measured data, as an error relative to the reference information.

2. The motor control apparatus according to claim 1, wherein, if the measurement values of the plurality of excitation phases include a value that is not in a first range, the determination unit determines that at least one of the motor and the excitation unit has a failure.

3. The motor control apparatus according to claim 1, wherein the determination unit determines a first excitation phase and a second excitation phase from among the plurality of excitation phases, based on the measured data, and, if the first excitation phase and the second excitation phase are not excitation phases adjacent to each other with respect to an electrical angle from among the plurality of excitation phases, determines that the measured data is abnormal,
the first excitation phase is an excitation phase of a first measurement value indicating a smallest inductance among the measurement values of the plurality of excitation phases, and
the second excitation phase is an excitation phase of a second measurement value indicating a second smallest inductance among the measurement values of the plurality of excitation phases.

4. The motor control apparatus according to claim 3, wherein, if the first excitation phase and the second excitation phase are excitation phases adjacent to each other with respect to the electrical angle from among the plurality of excitation phases, the determination unit determines a rotational position of the rotor based on a value of a ratio of the first measurement value to the second measurement value.

5. The motor control apparatus according to claim 4, wherein, if the value of the ratio of the first measurement value to the second measurement value is not within a second range, the determination unit determines that a rotational position of the rotor is a rotational position at which the rotor stops when the first excitation phase is excited.

6. The motor control apparatus according to claim 4, wherein, if the value of the ratio of the first measurement value to the second measurement value is within the second range, the determination unit determines that the rotational position of the rotor is between the rotational position at which the rotor stops when the first excitation phase is excited and a rotational position at which the rotor stops when the second excitation phase is excited.

7. The motor control apparatus according to claim 5, wherein the second range is a range that includes a ratio value of 1.

8. The motor control apparatus according to claim 1, wherein the determination unit determines whether or not at least one of the motor and the excitation unit has a failure, based on a first error that is smallest among the errors relative to the plurality of pieces of reference information.

9. The motor control apparatus according to claim 8, wherein, if the first error is larger than a first threshold value, the determination unit determines that at least one of the motor and the excitation unit has a failure.

10. The motor control apparatus according to claim 8, wherein the determination unit determines first reference information and second reference information out of the plurality of pieces of reference information based on the errors relative to the plurality of pieces of reference information, and if a first rotational position corresponding to the first reference information and a second rotational position corresponding to the second reference information from among the plurality of rotational positions are not adjacent rotational positions from among the plurality of rotational positions, determines that the measured data is abnormal,
the first reference information is reference information based on which the error is the first error, which is a smallest, among the plurality of pieces of reference information, and
the second reference information is reference information based on which the error is a second error, which is a second smallest, among the plurality of pieces of reference information.

11. The motor control apparatus according to claim 10, wherein, if the first rotational position and the second rotational position are adjacent rotational positions from among the plurality of rotational positions, the determination unit determines a rotational position of the rotor based on the value of the ratio of the first error to the second error.

12. The motor control apparatus according to claim 11, wherein, if the value of the ratio of the first error to the second error is smaller than a second threshold value, the determination unit determines that the rotational position of the rotor is the first rotational position.

13. The motor control apparatus according to claim 11, wherein, if the value of the ratio of the first error to the second error is larger than the second threshold value, the determination unit determines that rotational position of the rotor is between the first rotational position and the second rotational position.

14. The motor control apparatus according to claim 1, wherein a measurement value of the physical amount is a value that is based on excitation currents when the excitation unit excites each of the plurality of excitation phases for a predetermined period.

15. The motor control apparatus according to claim 14, wherein the measurement value of the physical amount is a largest value or an integration value of excitation currents when the excitation unit excites each of the plurality of excitation phases for a predetermined period.

16. An image forming apparatus comprising:
a rotating member for conveying a sheet along a conveyance path;
an image forming unit configured to form an image on the sheet that is conveyed on the conveyance path;
a motor for driving the rotating member or the image forming unit; and
a motor control unit configured to control the motor,
wherein the motor control unit includes:
an excitation unit configured to excite a plurality of excitation phases of the motor,
a measurement unit configured to measure a physical amount that changes according to an inductance of at least one of a plurality of coils of the motor by exciting each of the plurality of excitation phases, and generate measured data that includes measurement values of the physical amount measured for the plurality of excitation phases,
a storage unit configured to store a plurality of pieces of reference information that respectively correspond to a plurality of rotational positions of a rotor of the motor, the plurality of pieces of reference information indicating reference values of the respective excitation phases; and
a determination unit configured to determine a rotational position of the rotor and whether or not at least one of the motor and the excitation unit has a failure, by comparing the measured data with the plurality of pieces of reference information,
wherein the determination unit determines a rotational position of the rotor and whether or not at least one of the motor and the excitation unit has a failure, by obtaining, for each of the plurality of pieces of reference information, an integration value of differences between reference values of the plurality of excitation phases indicated by the reference information and the measurement values of the corresponding excitation phases indicated by the measured data, as an error relative to the reference information.

* * * * *